(12) United States Patent
Nakamura et al.

(10) Patent No.: US 12,436,234 B2
(45) Date of Patent: Oct. 7, 2025

(54) RADAR DEVICE

(71) Applicants: DENSO CORPORATION, Kariya (JP); MIRISE Technologies Corporation, Nisshin (JP)

(72) Inventors: Takuya Nakamura, Nisshin (JP); Teppei Yoshida, Nisshin (JP)

(73) Assignees: DENSO CORPORATION, Kariya (JP); MIRISE Technologies Corporation, Nisshin (JP)

(*) Notice: Subject to any disclaimer, the term of this patent is extended or adjusted under 35 U.S.C. 154(b) by 345 days.

(21) Appl. No.: 18/163,429

(22) Filed: Feb. 2, 2023

(65) Prior Publication Data
US 2023/0375665 A1 Nov. 23, 2023

(30) Foreign Application Priority Data
May 19, 2022 (JP) .............................. 2022-082282

(51) Int. Cl.
*G01S 7/35* (2006.01)
*G01S 7/02* (2006.01)
*G01S 7/36* (2006.01)
*G01S 13/34* (2006.01)
*G01S 13/931* (2020.01)

(52) U.S. Cl.
CPC .............. *G01S 7/354* (2013.01); *G01S 7/023* (2013.01); *G01S 7/36* (2013.01); *G01S 13/34* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 2008/0218406 A1* | 9/2008 | Nakanishi | G01S 13/345 342/192 |
| 2008/0231497 A1* | 9/2008 | Sakamoto | G01S 13/345 342/159 |
| 2009/0091492 A1* | 4/2009 | Sanyal | G01S 7/36 342/25 C |
| 2021/0132192 A1* | 5/2021 | Kimura | G01S 7/4873 |
| 2023/0251348 A1* | 8/2023 | Overdevest | G01S 13/931 342/189 |
| 2024/0192310 A1* | 6/2024 | Kitsukawa | G01S 7/023 |

FOREIGN PATENT DOCUMENTS

JP 4353008 B2 * 10/2009
KR 101429361 B1 8/2014

* cited by examiner

*Primary Examiner* — William Kelleher
*Assistant Examiner* — Ismaaeel A. Siddiquee
(74) *Attorney, Agent, or Firm* — Posz Law Group, PLC

(57) ABSTRACT

A radar device includes: a section generation unit configured to generate sections to divide a continuous time-series signal into ranges; a section representative value calculation unit configured to calculate a section representative value that is a representative value of the time-series signal within each of the ranges; a classification unit configured to classify the section representative value between a high interference section representative value containing much interference and a low interference section representative value containing little interference; a threshold calculation unit configured to calculate an interference determination threshold based on the low interference section representative value; and a determination value calculation unit configured to calculate an interference determination value based on the interference determination threshold.

18 Claims, 6 Drawing Sheets

RADAR DEVICE

CROSS REFERENCE TO RELATED APPLICATION

This application is based on Japanese Patent Application No. 2022-082282 filed on May 19, 2022, the disclosure of which is incorporated herein by reference.

TECHNICAL FIELD

The present disclosure relates to a radar device.

BACKGROUND

A radar is used to measure a distance or speed relative to an object. A radar signal is a so-called time-series continuous signal, and may be subject to interference from the other radar signals, in an interference-affected section.

SUMMARY

A radar device includes: a section generation unit configured to generate a section to divide a continuous time-series signal into a plurality of ranges; a section representative value calculation unit configured to calculate a section representative value that is a representative value of the time-series signal within each of the ranges; a classification unit configured to classify the section representative value between a high interference section representative value containing much interference and a low interference section representative value containing little interference; a threshold calculation unit configured to calculate an interference determination threshold based on the low interference section representative value; and a determination value calculation unit configured to calculate an interference determination value based on the interference determination threshold.

DETAILED DESCRIPTION

Figure 1:
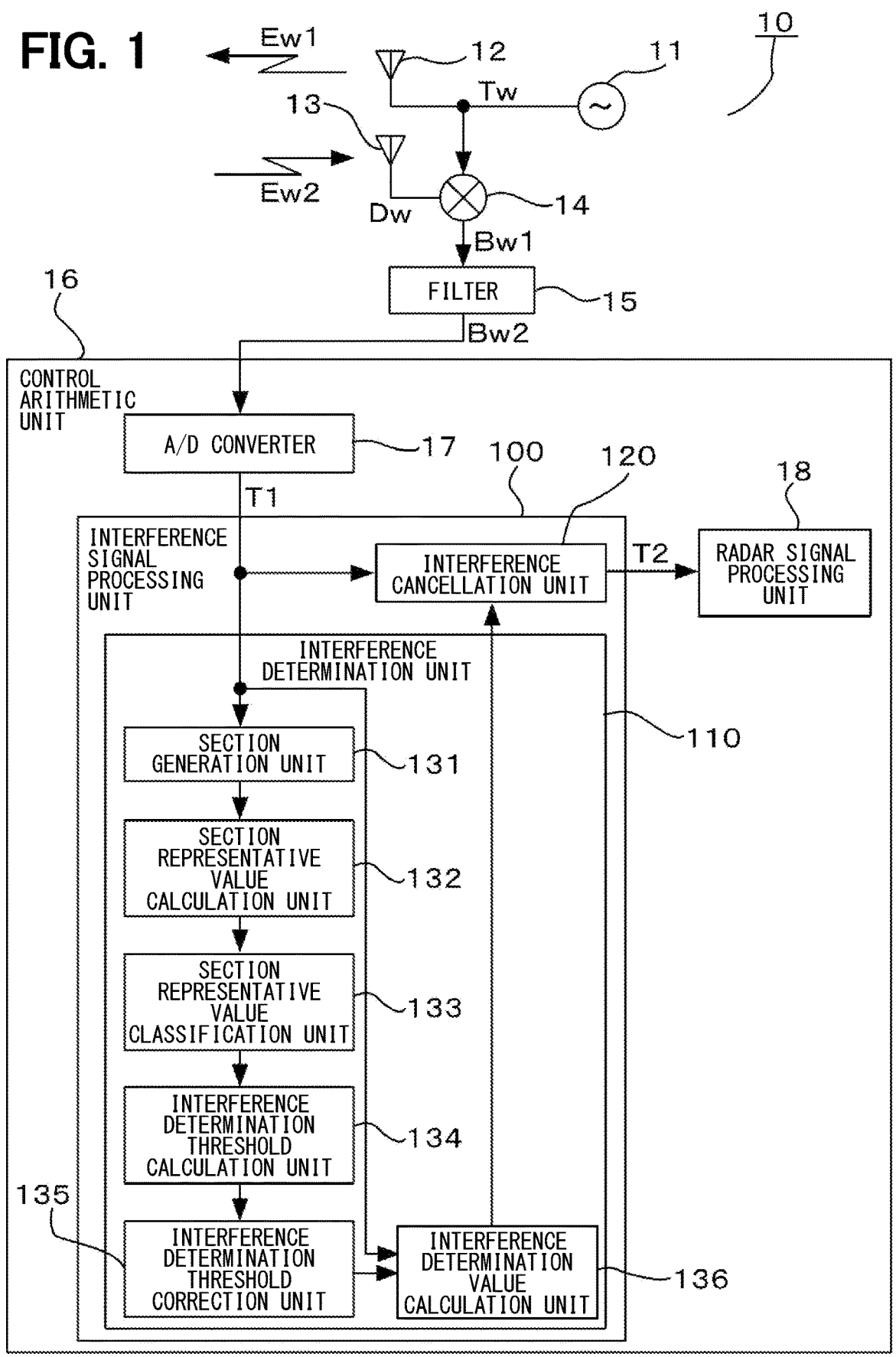
FIG. 1 is a diagram schematically showing a configuration of a radar device according to an embodiment.

In the field of vehicle technology, many technologies related to collision prevention and automatic driving have been proposed. For example, a radar is used to measure a distance or speed relative to an object. A radar signal is a so-called time-series continuous signal, and may be subject to interference from the other radar signals, in an interference-affected section. If signal processing is performed without taking any countermeasures against such interference signals, the processing performance of radar signal will be degraded. Conventionally, it is considered to eliminate the influence of interference by zero-filling, that is, invalidating the interference-affected section of the radar signal.

In addition, as a technique for specifying an interference section in a radar signal, which is a time-series signal, for example, it is considered to use the property that the intensity of signal increases by the amount of interference in an interference section. That is, when the intensity of signal is an abnormal value exceeding a predetermined threshold, it can be determined that the section is subject to interference. The threshold in this case can be set based on a statistical representative value such as average value, mode value, or median value of the intensity of the radar signal. However, when the section subjected to interference is relatively long, the calculated representative value is strongly affected by the interference. Therefore, it becomes difficult to set an appropriate threshold, and thus it becomes difficult to determine whether or not there is interference.

For example, a radar signal, which is a time-series signal, is divided into plural sections, and an average value of signal intensity is calculated within each section. The minimum value of the calculated average values is set as a threshold for determining whether or not there is interference. However, with this technique, there is a possibility that a value that is too low may be set as the threshold, which makes it difficult to accurately determine whether or not there is interference.

The present disclosure provides a radar device that can accurately determine the presence or absence of interference even when the time-series signal receives interference during relatively long section.

A radar device includes: a section generation unit configured to generate a section to divide a continuous time-series signal into a plurality of ranges; a section representative value calculation unit configured to calculate a section representative value that is a representative value of the time-series signal within each of the ranges; a classification unit configured to classify the section representative value between a high interference section representative value containing much interference and a low interference section representative value containing little interference; a threshold calculation unit configured to calculate an interference determination threshold based on the low interference section representative value; and a determination value calculation unit configured to calculate an interference determination value based on the interference determination threshold.

A radar device according to an embodiment of the of the present disclosure will be described below with reference to the drawings. A radar device 10 illustrated in FIG. 1 includes a signal generator 11, a signal emitter 12, a signal receiver 13, a signal mixer 14, a filter 15, and a control arithmetic unit 16.

The signal generator 11 has a well-known configuration including, for example, a voltage-controlled oscillator and a control device, and is configured to generate a transmission signal Tw. The signal emitter 12 is called, for example, a signal radiating antenna and is configured to radiate the transmission signal Tw into space as an electromagnetic wave Ew1. The electromagnetic wave Ew1 emitted by the signal emitter 12 is reflected by an object (not shown) and travels toward the radar device 10 as an electromagnetic wave Ew2. The signal receiver 13 is called, for example, a signal receiving antenna and is configured to receive the electromagnetic wave Ew2 reflected from the object as a reception signal Dw.

The signal mixer 14 is configured to mix the transmission signal Tw and the reception signal Dw to generate a bead signal Bw1. The filter 15 is configured to allow passage of only a bead signal Bw2 in the required frequency band out of the bead signal Bw1. It should be noted that the frequency band to be passed through the filter 15 can be changed and set as appropriate.

The control arithmetic unit 16 has an analog-to-digital converter 17. In the drawings, the analog-to-digital converter 17 is described as an "A/D converter". The control arithmetic unit 16 is configured such that the analog-to-digital converter 17 can convert the bead signal Bw2 into a time-series signal T1. The time-series signal T1 has a form that is continuous in time series over a predetermined period of time. Note that the length of the time-series signal T1 may vary depending on, for example, the lengths of the transmission signal Tw and the reception signal Dw.

The control arithmetic unit 16 includes an interference signal processing unit 100 and a radar signal processing unit 18. The interference signal processing unit 100 and the radar signal processing unit 18 are virtually realized by software, for example. Note that the interference signal processing unit 100 and the radar signal processing unit 18 may be realized by hardware, or may be realized by a combination of software and hardware.

The interference signal processing unit 100, which will be described later in detail, is configured to generate an interference cancellation signal T2 by removing the influence of interference from the time-series signal T1. The radar signal processing unit 18 is configured to measure the relative distance and relative speed between the radar device 10 and the object (not shown) based on the interference cancellation signal T2 generated by the interference signal processing unit 100.

Next, a configuration of the interference signal processing unit 100 will be described in more detail. The interference signal processing unit 100 includes an interference determination unit 110 and an interference cancellation unit 120. The interference determination unit 110 and the interference cancellation unit 120 are virtually realized by software, for example. Note that the interference determination unit 110 and the interference cancellation unit 120 may be realized by hardware, or may be realized by a combination of software and hardware.

The interference determination unit 110 includes a section generation unit 131, a section representative value calculation unit 132, a section representative value classification unit 133, an interference determination threshold calculation unit 134, an interference determination threshold correction unit 135, and an interference determination value calculation unit 136. The section generation unit 131, the section representative value calculation unit 132, the section representative value classification unit 133, the interference determination threshold calculation unit 134, the interference determination threshold correction unit 135, and the interference determination value calculation unit 136 are virtually realized by software, for example. Note that the section generation unit 131, the section representative value calculation unit 132, the section representative value classification unit 133, the interference determination threshold calculation unit 134, the interference determination threshold correction unit 135, and the interference determination value calculation unit 136 may be realized by hardware or implemented by a combination of software and hardware.

Figure 2:
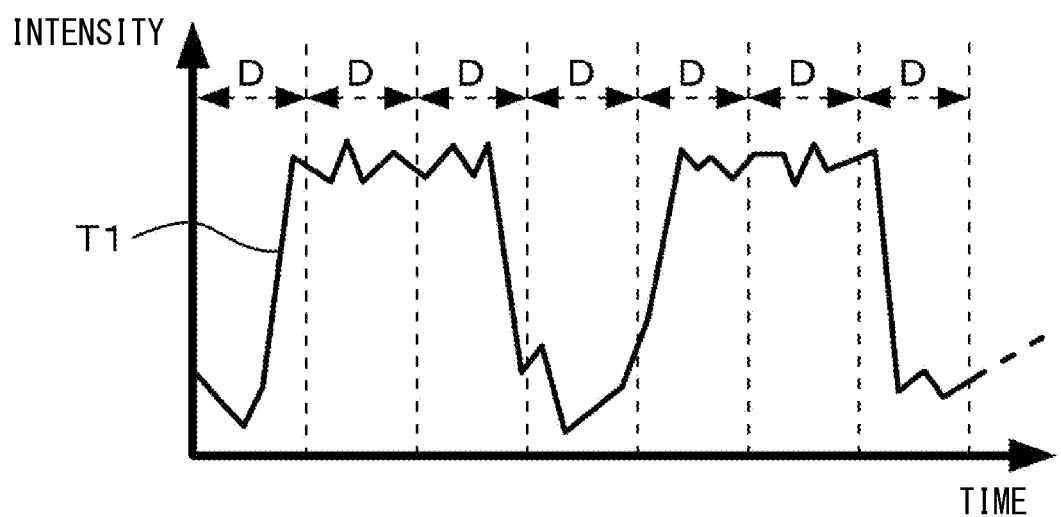
FIG. 2 is a diagram schematically showing a processing by a section generation unit of the embodiment.

As illustrated in FIG. 2, the section generation unit 131 is configured to generate sections D for dividing the continuous original time-series signal T1 into a plurality of ranges. Note that the section generation unit 131 does not divide the continuous original time-series signal T1 into plural physically divided fragment signals, but rather virtually divides the single continuous time-series signal T1 into plural sections D. However, the section generation unit 131 may divide the continuous original time-series signal T1 into plural physically divided fragment signals.

Figure 3:
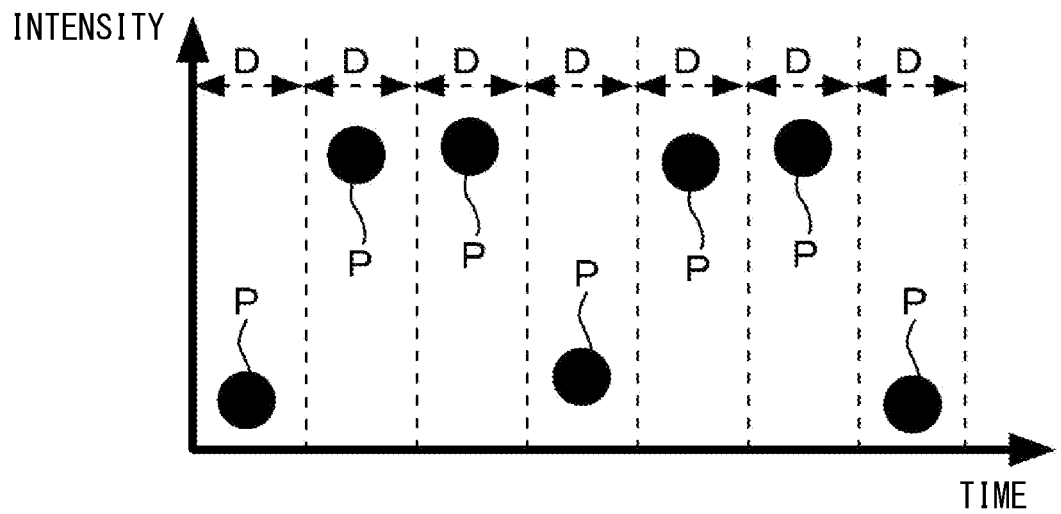
FIG. 3 is a diagram schematically showing a processing by a section representative value calculation unit of the embodiment.

As illustrated in FIG. 3, the section representative value calculation unit 132 is configured to calculate a section representative value P that is a representative value of the time-series signal T1 within the range of each section D. That is, the section representative value calculation unit 132 calculates a statistical value such as an average value, a median value, a mode value, a maximum value, and a minimum value for the intensity of the partial time-series signal T1 included in each section D. The calculated statistical value is calculated as the section representative value P representing the representative value of the intensity of the time-series signal T1 in the section D.

Figure 4:
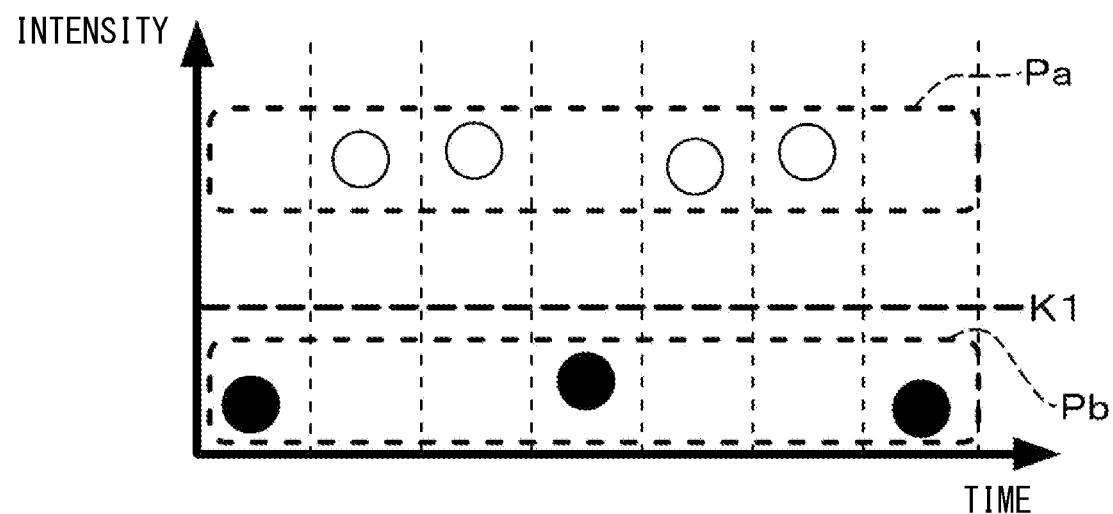
FIG. 4 is a diagram schematically showing a processing by a section representative value classification unit of the embodiment.

As exemplified in FIG. 4, the section representative value classification unit 133 is configured to classify the section representative values P calculated by the section representative value calculation unit 132 into a high interference section representative value Pa containing much interference and a low interference section representative value Pb not containing much interference, compared with the high interference section representative value Pa. More specifically, the section representative value classification unit 133 calculates a classification threshold K1 based on the section representative values P calculated by the section representative value calculation unit 132.

In this case, the section representative value classification unit 133 rearranges the section representative values P calculated by the section representative value calculation unit 132 in ascending order or descending order. Then, the section representative value classification unit 133 sets the section representative value P at a predetermined order among the section representative values P rearranged in ascending or descending order as a reference section representative value. Then, the section representative value classification unit 133 is configured to calculate the classification threshold K1 based on the reference section representative value.

In this case, the section representative value classification unit 133 is configured to calculate a value obtained by adding or subtracting a predetermined offset value to or from the reference section representative value as the classification threshold K1. It should be noted that which order of the section representative value P is set as the reference section representative value can be changed and set as appropriate. Also, the predetermined offset value can be changed and set as appropriate. The section representative value classification unit 133 may set the reference section representative value itself as the classification threshold K1. Further, the method for calculating the classification threshold K1 is not limited to the above, and various methods can be applied while the classification threshold K1 is calculated based on the section representative values P.

Then, the section representative value classification unit 133 classifies the section representative values P into the high interference section representative value Pa and the low interference section representative value Pb based on the calculated classification threshold K1. In this case, the section representative value classification unit 133 classifies the section representative value P larger than the classification threshold K1 into the high interference section representative value Pa, and the section representative value classification unit 133 classifies the section representative value P smaller than the classification threshold K1 into the low interference section representative value Pb. When there is a section representative value P equal to the classification threshold K1, the section representative value P may be classified into the high interference section representative value Pa or the low interference section representative value Pb.

Figure 5:
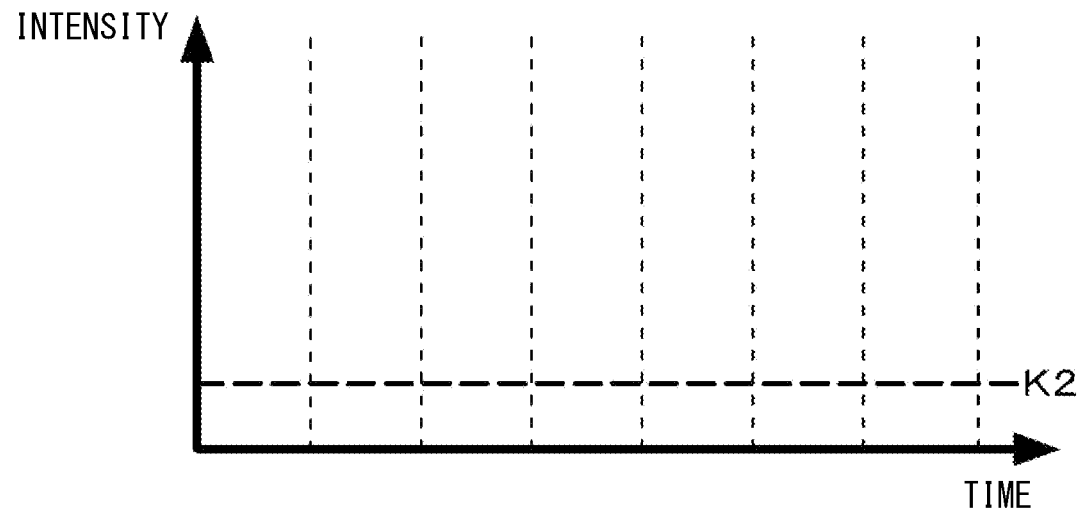
FIG. 5 is a diagram schematically showing a processing by an interference determination threshold calculation unit of the embodiment.

As illustrated in FIG. 5, the interference determination threshold calculation unit 134 is configured to calculate the interference determination threshold K2 based on the value of the section representative value P that has been classified into the low interference section representative value Pb by the section representative value classification unit 133. In this case, the interference determination threshold calculation unit 134 calculates statistical values such as an average value, a median value, a mode value, a maximum value, and a minimum value for the values of the low interference section representative values Pb. Then, the interference determination threshold calculation unit 134 calculates the calculated statistical value as the interference determination threshold K2. The interference determination threshold calculation unit 134 is configured to store the calculated interference determination threshold K2 in a storage medium (not shown) of the radar device 10.

Note that the interference determination threshold calculation unit 134 may calculate the interference determination threshold K2 based on all the values of the low interference section representative values Pb, or at least two of the low interference section representative values Pb. The interference determination threshold K2 may be calculated based on at least one of the low interference section representative values Pb. The interference determination threshold calculation unit 134 may calculate the interference determination threshold K2 based on a representative value of the original time-series signal T1 in the section D where the representative value P is classified to the low interference section representative values Pb.

Figure 6:
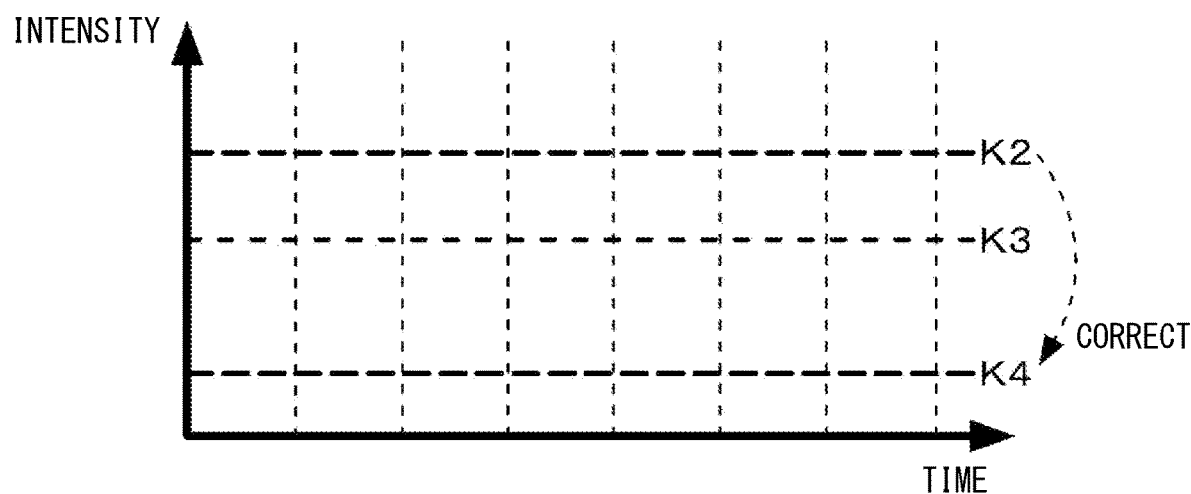
FIG. 6 is a diagram schematically showing a processing by an interference determination threshold correction unit of the embodiment.

As illustrated in FIG. 6, the interference determination threshold correction unit 135 is configured to correct the interference determination threshold K2 calculated by the interference determination threshold calculation unit 134 based on the previously calculated interference determination threshold K2. More specifically, the interference determination threshold correction unit 135 calculates statistical values such as an average value, a median value, a mode value, a maximum value, and a minimum value for the previously calculated interference determination thresholds K2, and the calculated statistical value is calculated as a representative value of the past interference determination threshold K2. Then, the interference determination threshold correction unit 135 sets a value obtained by adding or subtracting a predetermined offset value to or from the calculated past interference determination threshold K2 as an abnormality determination threshold K3. Note that the predetermined offset value can be changed and set as appropriate. Further, the interference determination threshold correction unit 135 may set the calculated representative value itself of the past interference determination threshold K2 as the abnormality determination threshold K3.

Then, when the interference determination threshold K2 is calculated by the interference determination threshold calculation unit 134, the interference determination threshold correction unit 135 compares the interference determination threshold K2 with an abnormality determination threshold K3. When the interference determination threshold K2 is larger than the abnormality determination threshold K3, the interference determination threshold correction unit 135 corrects the value of the interference determination threshold K2 to a predetermined correction value K4, and outputs the value to the interference determination value calculation unit 136. Note that the value of the predetermined correction value K4 can be changed and set as appropriate.

When the interference determination threshold K2 is smaller than the abnormality determination threshold K3, the interference determination threshold correction unit 135 does not correct the interference determination threshold K2, and the interference determination threshold K2 is output as it is to the interference determination value calculation unit 136. When the interference determination threshold K2 is equal to the abnormality determination threshold K3, the interference determination threshold correction unit 135 may correct or may not correct the interference determination threshold K2.

The interference determination threshold correction unit 135 may correct the interference determination threshold K2, for example, based on the moving average value of the past interference determination thresholds K2, or based on the mode value of the past interference determination thresholds K2. The interference determination threshold correction unit 135 can correct the interference determination threshold K2 based on various statistical values of the past interference determination thresholds K2.

Figure 7:
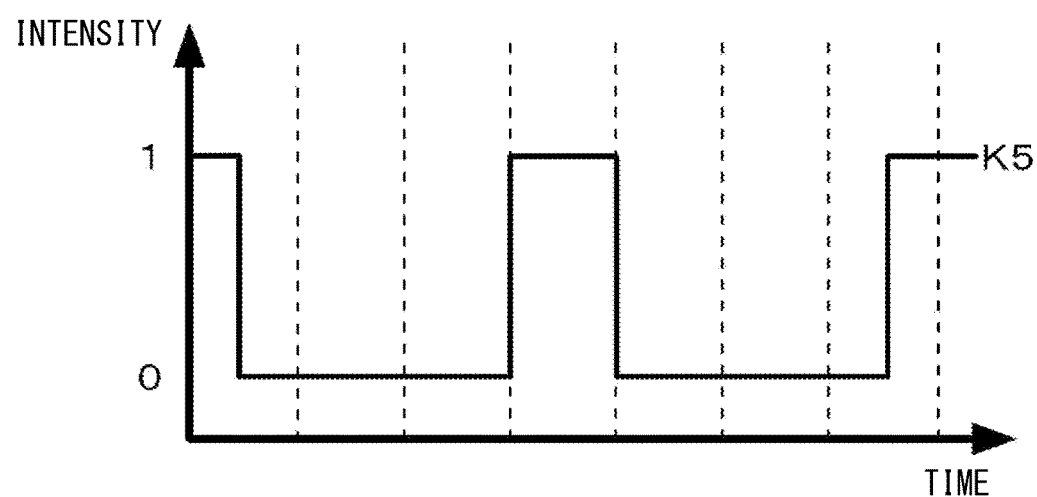
FIG. 7 is a diagram schematically showing a processing by an interference determination value calculation unit of the embodiment.

As illustrated in FIG. 7, the interference determination value calculation unit 136 is configured to calculate the interference determination value K5 based on the interference determination threshold K2 calculated by the interference determination threshold calculation unit 134 or based on the interference determination threshold K2 corrected by the interference determination threshold correction unit 135. More specifically, the interference determination value calculation unit 136 compares the intensity of the original time-series signal T1 with the interference determination threshold K2. The interference determination value calculation unit 136 assigns a determination value "0" to a range in which the intensity of the original time-series signal T1 is greater than the interference determination threshold K2, and assigns a determination value of "1" to a range in which the intensity of the original time-series signal T1 is smaller than the interference determination threshold K2. Accordingly, the interference determination value calculation unit 136 calculates the interference determination value K5 consisting of the determination values "0" and "1" from the time-series signal T1. The interference determination value calculation unit 136 may assign a determination value of "1" or a determination value of "0" to a range in which the intensity of the time-series signal T1 is equal to the interference determination threshold K2.

Figure 8:
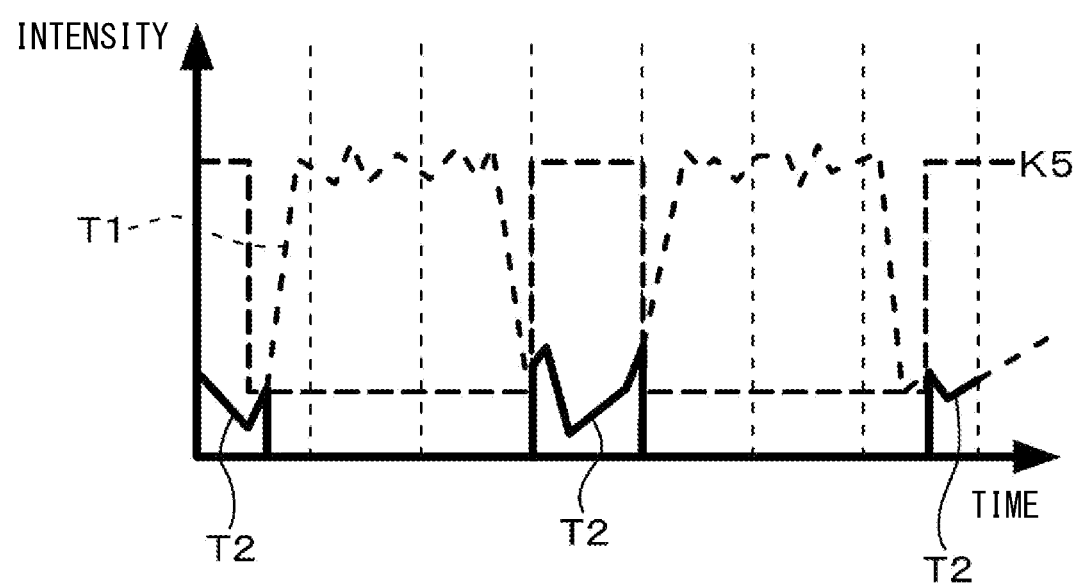
FIG. 8 is a diagram schematically showing a processing by an interference cancellation unit of the embodiment.

As illustrated in FIG. 8, the interference cancellation unit 120 is configured to generate an interference cancellation signal T2 from the original time-series signal T1 using the interference determination value K5 calculated by the interference determination value calculation unit 136. More specifically, the interference cancellation unit 120 compares the intensity of the original time-series signal T1 with the interference determination value K5. The interference cancellation unit 120 removes a portion of the original time-series signal T1 whose intensity is greater than the interference determination value K5 and leaves only a portion whose intensity is less than the interference determination value K5, so as to generate the interference cancellation signal T2. The interference cancellation signal T2 generated in this way can be defined as a signal in which only the portion smaller than the interference determination value K5 remains from the original continuous time-series signal T1. The interference cancellation unit 120 may remove or may not remove a portion of the original time-series signal T1 whose intensity is equal to the interference determination value K5 as the interference cancellation signal T2.

Through the above processing, the interference signal processing unit 100 finally generates the interference cancellation signal T2 from the time-series signal T1. The interference signal processing unit 100 outputs the generated interference cancellation signal T2 to the radar signal processing unit 18. The radar signal processing unit 18 is configured to measure the relative distance and relative speed between the radar device 10 and an object (not shown) based on the interference cancellation signal T2 obtained from the interference signal processing unit 100. Various processing methods can be applied to the measurement processing by the radar signal processing unit 18 while the processing is capable of measuring the relative distance and relative speed to an object (not shown).

Figure 9:
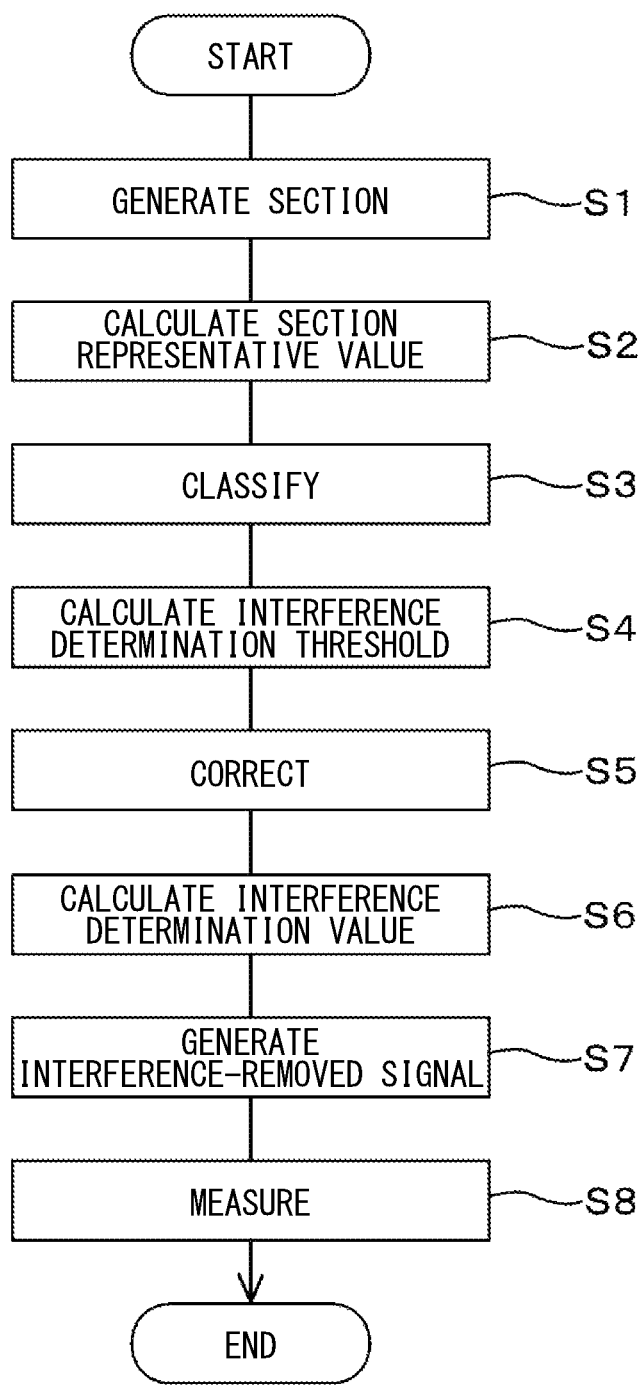
FIG. 9 is a flowchart schematically showing an overall processing by the radar device of the embodiment.

Next, the above-described processing by the radar device 10 will be described based on a flowchart. As illustrated in FIG. 9, the radar device 10 generates sections D for dividing a continuous original time-series signal T1 into a plurality of ranges (step S1). Then, the radar device 10 calculates a section representative value P that is a representative value of the time-series signal T1 within each section D (step S2). Then, the radar device 10 classifies the plurality of section representative values P into a high interference section representative value Pa containing much interference and a low interference section representative value Pb containing little interference (step S3). Then, the radar device 10 calculates the interference determination threshold K2 based on the values of the section representative values P divided into the low interference section representative values Pb (step S4).

Then, the radar device 10 corrects the calculated interference determination threshold K2 based on the previously calculated interference determination threshold K2, if necessary (step S5). Then, the radar device 10 calculates an interference determination value K5 based on the calculated interference determination threshold K2 or the corrected interference determination threshold K2 (step S6). Then, the radar device 10 uses the calculated interference determination value K5 to generate an interference cancellation signal T2 by removing the influence of interference from the original time-series signal T1 (step S7) as an interference-removed signal. Then, the radar device 10 measures the relative distance, relative speed, and the like to an object (not shown) based on the interference cancellation signal T2 (step S8).

According to the radar device 10, the section generation unit 131 generates the sections D for dividing the continuous original time-series signal T1 into a plurality of ranges. Then, the section representative value calculation unit 132 calculates the section representative value P that is the representative value of the original time-series signal T1 within the range of each section D. Then, the section representative value classification unit 133 classifies the plurality of section representative values P into the high interference section representative value Pa containing much interference and the low interference section representative value Pb containing little interference. Then, the interference determination threshold calculation unit 134 calculates the interference determination threshold K2 based on the low interference section representative value Pb. Then, the interference determination value calculation unit 136 calculates the interference determination value K5 based on the interference determination threshold K2.

That is, according to the radar device 10, the interference determination value K5 for removing the interference from the original time-series signal T1 is generated by utilizing the representative value in the section D that does not contain much interference in the continuous original time-series signal T1. Accordingly, even while the section of the original time-series signal T1 that is subject to interference is relatively long, it is possible to accurately determine the presence or absence of the interference. Thus, it is possible to accurately measure the relative distance and relative velocity to an object (not shown) based on the signal from which the interference is removed.

Further, according to the radar device 10, the section representative value classification unit 133 calculates the classification threshold K1 based on the section representative values P, and classifies the section representative values P between the high interference section representative value Pa and the low interference section representative value Pb based on the classification threshold K1. Accordingly, it is possible to accurately classify the section representative values P into the high interference section representative value Pa and the low interference section representative value Pb based on the clear reference value that is the classification threshold K1.

Further, according to the radar device 10, the interference determination threshold calculation unit 134 can calculate the interference determination threshold K2 based on at least one of the low interference section representative values Pb. In this way, it is possible to calculate the interference determination threshold K2 by reflecting the intensity within the range where the original time-series signal T1 is not affected by interference or the interference is small, by calculating based on at least one low interference section representative value Pb.

Further, according to the radar device 10, the section representative value classification unit 133 can calculate the classification threshold K1 based on the section representative value P at a predetermined rank among the section representative values P rearranged in ascending order or descending order. This makes it possible to calculate a more optimal classification threshold K1.

Further, according to the radar device 10, the interference determination threshold calculation unit 134 can calculate the interference determination threshold K2 based on the representative value of the time-series signal T1 in the section D where the section representative value P is classified to the low interference section representative value Pb among the section representative values P. As a result, it is possible to calculate the interference determination threshold K2 that further reflects the intensity within the range where the interference does not affect the original time-series signal T1 or where there is little interference.

Further, according to the radar device 10, the interference determination threshold calculation unit 134 can calculate the interference determination threshold K2 based on a statistical value calculated based on the plural low interference section representative values Pb. By using such statistical processing, it is possible to calculate the interference determination threshold K2 that accurately reflects the intensity within the range where the interference is not received by the original time-series signal T1 or where there is little interference.

Further, according to the radar device 10, the interference determination threshold correction unit 135 can correct and modify the interference determination threshold K2 calculated by the interference determination threshold calculation unit 134 based on the interference determination threshold K2 obtained in the past. Accordingly, it is possible to set a more optimal interference determination threshold K2 that reflects the value of the interference determination threshold K2 obtained in the past.

Further, according to the radar device 10, the interference determination threshold correction unit 135 can correct and modify the interference determination threshold K2 based on the representative value of the past interference determination thresholds K2. As a result, it is possible to correct the interference determination threshold K2 to a more optimal value while also reflecting the value of the interference determination threshold K2 obtained in the past.

For example, according to the radar device 10, the interference determination threshold correction unit 135 may correct the current interference determination threshold K2 based on the moving average value of the past interference determination threshold K2, or by correcting the current interference determination threshold K2 based on the mode value of the past interference determination threshold K2. Thus, it is possible to correct the interference determination threshold K2 to a statistically corrected, more optimal one.

Note that the present disclosure is not limited to the above-described embodiment, and can be appropriately modified and expanded without departing from the scope of the present disclosure. For example, the radar device 10 may include a processor that performs predetermined processing on the time-series signal T1, downstream of the analog-to-digital converter 17. The predetermined processing may be, for example, for filtering signal differences or noise.

Although the present disclosure has been described in accordance with the embodiment, it is understood that the present disclosure is not limited to the above embodiment and configurations. The present disclosure also encompasses various modifications and variations within the scope of equivalents. In addition, other combinations and configurations including further only a single element, more or less, are also within the spirit and scope of the present disclosure.

The control device/unit/method described in the present disclosure may be implemented by a special purpose computer provided by configuring a memory and a processor programmed to execute one or more functions embodied by a computer program. Alternatively, the control device/unit/method described in the present disclosure may be realized by a dedicated computer configured as a processor with one or more dedicated hardware logic circuits. Alternatively, the control device/unit/method described in the present disclosure may be realized by one or more dedicated computer, which is configured as a combination of a processor and a memory, programmed to perform one or more functions, and a processor which is configured with one or more hardware logic circuits. The computer program may also be stored on a computer readable non-transitory tangible storage medium as instructions to be executed by a computer.

According to a first aspect of the present disclosure, a radar device includes:
a section generation unit configured to generate a plurality of sections into which a continuous time-series signal is divided;
a section representative value calculation unit configured to calculate a section representative value that is a representative value of the time-series signal within each of the sections;
a classification unit configured to classify the section representative value between a high interference section representative value containing interference and a low interference section representative value containing little interference less than that of the high interference section representative value;
a threshold calculation unit configured to calculate an interference determination threshold based on the low interference section representative value; and
a determination value calculation unit configured to calculate an interference determination value based on the interference determination threshold.

According to a second aspect of the present disclosure, the classification unit calculates a classification threshold based on the plurality of section representative values, and classifies the plurality of section representative values into the high interference section representative value and the low interference section representative value based on the classification threshold, in the first aspect of the present disclosure.

According to a third aspect of the present disclosure, the threshold calculation unit calculates the interference determination threshold based on at least one of the plurality of low interference section representative values, in the second aspect of the present disclosure.

According to a fourth aspect of the present disclosure, the classification unit calculates the classification threshold based on the section representative value at a predetermined order among the plurality of section representative values rearranged in ascending or descending order, in the third aspect of the present disclosure.

According to a fifth aspect of the present disclosure, the threshold calculation unit calculates the interference determination threshold based on the representative value of the time-series signal in the section in which the section representative value is classified into the low interference section representative value among the plurality of section representative values, in any one of the first to fourth aspects of the present disclosure.

According to a sixth aspect of the present disclosure, the threshold calculation unit calculates the interference determination threshold based on a statistical value calculated based on the plurality of low interference section representative values, in any one of the first to fifth aspects of the present disclosure.

According to a seventh aspect of the present disclosure, the radar device further comprising a threshold correction unit configured to correct the interference determination threshold calculated by the threshold calculation unit based on a past interference determination threshold, in any one of the first to sixth aspects of the present disclosure.

According to an eighth aspect of the present disclosure, the threshold correction unit corrects the interference determination threshold based on a representative value of the past interference determination thresholds, in the seventh aspect of the present disclosure.

According to a ninth aspect of the present disclosure, the threshold correction unit corrects the interference determination threshold based on a moving average value of the past interference determination thresholds, in the eighth aspect of the present disclosure.

According to a tenth aspect of the present disclosure, the threshold correction unit corrects the interference determination threshold based on a mode value of the past interference determination thresholds, in the eighth aspect of the present disclosure.

According to an eleventh aspect of the present disclosure, a radar device includes:
a computer including a processor and a memory that stores instructions configured to, when executed by the processor, cause the processor to
generate a plurality of sections into which a continuous time-series signal is divided;
calculate a section representative value that is a representative value of the time-series signal within each of the sections;
classify the section representative value between a high interference section representative value containing interference and a low interference section representative value containing interference less than that of the high interference section representative value;
calculate an interference determination threshold based on the low interference section representative value; and
calculate an interference determination value based on the interference determination threshold.

What is claimed is:

1. A radar device comprising:
a section generation unit configured to generate a plurality of sections into which a continuous time-series signal is divided;
a section representative value calculation unit configured to calculate a section representative value that is a representative value of the time-series signal within each of the sections;
a classification unit configured to classify the section representative value between a high interference section representative value containing interference and a low interference section representative value containing interference less than that of the high interference section representative value;
a threshold calculation unit configured to calculate an interference determination threshold based on the low interference section representative value; and
a determination value calculation unit configured to calculate an interference determination value based on the interference determination threshold,
wherein
the classification unit calculates a classification threshold based on the section representative value which is one of a plurality of section representative values, and
the classification unit classifies the plurality of section representative values between the high interference section representative value and the low interference section representative value based on the classification threshold.

2. The radar device according to claim 1, wherein the threshold calculation unit calculates the interference determination threshold based on at least one of the low interference section representative value which is one of a plurality of low interference section representative values.

3. The radar device according to claim 2, wherein the classification unit calculates the classification threshold based on the section representative value at a predetermined order among the plurality of section representative values rearranged in ascending or descending order.

4. The radar device according to claim 1, wherein the threshold calculation unit calculates the interference determination threshold based on the representative value of the time-series signal in the section where the section representative value is classified into the low interference section representative value among the plurality of section representative values.

5. The radar device according to claim 1, wherein the threshold calculation unit calculates the interference determination threshold based on a statistical value calculated based on a plurality of low interference section representative values.

6. The radar device according to claim 1, further comprising a threshold correction unit configured to correct the interference determination threshold calculated by the threshold calculation unit based on a past interference determination threshold.

7. The radar device according to claim 6, wherein the threshold correction unit corrects the interference determination threshold based on a representative value of the past interference determination threshold.

8. The radar device according to claim 7, wherein the threshold correction unit corrects the interference determination threshold based on a moving average value of the past interference determination threshold.

9. The radar device according to claim 7, wherein the threshold correction unit corrects the interference determination threshold based on a mode value of the past interference determination threshold.

10. A radar device comprising:
a computer including a processor and a memory that stores instructions configured to, when executed by the processor, cause the processor to
generate a plurality of sections into which a continuous time-series signal is divided;
calculate a section representative value that is a representative value of the time-series signal within each of the sections;
classify the section representative value between a high interference section representative value containing interference and a low interference section representative value containing interference less than that of the high interference section representative value;
calculate an interference determination threshold based on the low interference section representative value;
calculate an interference determination value based on the interference determination threshold; and
calculate a classification threshold based on the section representative value which is one of a plurality of section representative values,
wherein
the plurality of section representative values is classified between the high interference section representative value and the low interference section representative value based on the classification threshold.

11. The radar device according to claim 10, wherein the interference determination threshold is calculated based on at least one of the low interference section representative value which is one of a plurality of low interference section representative values.

12. The radar device according to claim 11, wherein the classification threshold is calculated based on the section representative value at a predetermined order among the plurality of section representative values rearranged in ascending or descending order.

13. The radar device according to claim 10, wherein the interference determination threshold is calculated based on the representative value of the time-series signal in the section where the section representative value is classified into the low interference section representative value among the plurality of section representative values.

14. The radar device according to claim 10, wherein the interference determination threshold is calculated based on a statistical value calculated based on a plurality of low interference section representative values.

15. The radar device according to claim 10, wherein the interference determination threshold is corrected based on a past interference determination threshold.

16. The radar device according to claim 15, wherein the interference determination threshold is corrected based on a representative value of the past interference determination threshold.

17. The radar device according to claim 16, wherein the interference determination threshold is corrected based on a moving average value of the past interference determination threshold.

18. The radar device according to claim 16, wherein the interference determination threshold is corrected based on a mode value of the past interference determination threshold.

\* \* \* \* \*